United States Patent [19]

Joncker et al.

[11] Patent Number: 4,738,735

[45] Date of Patent: Apr. 19, 1988

[54] METHOD AND APPARATUS FOR CONTINUOUSLY EXTRUDING AN ELASTOMERIC MATERIAL ON THE INTERIOR OF A CONTINUOUS TUBULAR WOVEN FABRIC IN A LOOM

[75] Inventors: Helmut Joncker, Hawkesbury; Richard J. McAlpine, Brownsburg, both of Canada

[73] Assignee: Mercedes Textiles Limited, Ontario, Canada

[21] Appl. No.: 927,075

[22] Filed: Nov. 5, 1986

[51] Int. Cl.⁴ .................. B29D 23/00; B29C 47/06; B29C 47/10; B29C 47/92

[52] U.S. Cl. ..................... 156/64; 156/149; 156/244.13; 156/352; 156/393; 156/500; 264/40.5; 264/173; 264/209.1; 264/40.7; 425/114

[58] Field of Search ............ 156/64, 149, 244.13, 156/393, 500, 352; 264/40.5, 173, 174, 176.1, 209.1, 40.7; 425/114

[56] References Cited

U.S. PATENT DOCUMENTS

| | | | |
|---|---|---|---|
| 1,327,677 | 1/1920 | Kennedy | 156/393 |
| 2,990,577 | 7/1961 | De Laubarede | |
| 3,159,877 | 12/1964 | Orsini | |
| 3,375,550 | 4/1968 | Klein | 425/114 |
| 3,388,425 | 6/1968 | Detter | |
| 3,418,404 | 12/1968 | Hird | |
| 3,459,621 | 8/1969 | Kamenyarzh et al. | 156/393 |
| 3,585,707 | 6/1971 | Stevens | |
| 3,869,304 | 3/1975 | Bogulslawski et al. | |
| 3,920,049 | 11/1975 | Lippert et al. | |
| 3,961,873 | 6/1976 | Brown | 264/173 |
| 4,155,790 | 5/1979 | Galloway | |
| 4,202,718 | 5/1980 | Mizutani et al. | 156/244.13 |
| 4,219,522 | 8/1980 | Oyama | |
| 4,279,857 | 7/1981 | Feuerherm | 264/209.1 |
| 4,302,266 | 11/1981 | Kutnyak | 156/244.13 |
| 4,326,905 | 4/1982 | Tanaua | 156/244.13 |
| 4,362,488 | 12/1982 | Casals et al. | |
| 4,472,126 | 9/1984 | Mitsui et al. | |
| 4,478,661 | 10/1984 | Lewis | |
| 4,490,316 | 12/1984 | Satzler | |
| 4,501,629 | 2/1985 | Satzler | 156/244.13 |
| 4,657,718 | 4/1987 | Sicka et al. | 264/173 |

*Primary Examiner*—Jerome Massie, IV

[57] ABSTRACT

A method for continuously extruding an elastomeric material on the interior of a continuous tubular woven fabric in a loom, comprising motive means for creating relevant movement between the extruder and the woven fabric, sensing means for detecting stoppage of said loom, control means responsive to said sensing means directing said motive means to move said extruder relative to said woven fabric and a tubular woven fabric having an interior layer extruded directly onto the interior of the tubular woven fabric.

4 Claims, 2 Drawing Sheets

METHOD AND APPARATUS FOR CONTINUOUSLY EXTRUDING AN ELASTOMERIC MATERIAL ON THE INTERIOR OF A CONTINUOUS TUBULAR WOVEN FABRIC IN A LOOM

This invention relates to an apparatus and method for continuously applying an elastomeric material on the interior of a continuous tubular woven fabric in a loom.

The most common method in use to line tubular woven fabric involves cutting the tubular woven fabric into lengths of fifty, seventy-five, one hundred feet or up to two hundred feet. A pre-fabricated tubular liner having a diameter slightly smaller than the inside diameter of the woven tubular fabric and cut to substantially the same length as the tubular woven fabric is coated with an adhesive and pulled through the tubular woven fabric. Subsequently the adhesive has to be activated or cured, which is commonly done by steam pressure. This method has a number of drawbacks. The tubular woven fabric is cut into lengths and a continuous tubular woven fabric of substantial length cannot be lined with a continuous tubular liner. The step of inserting the tubular liner into the tubular woven fabric is separate from the process of weaving the tubular woven fabric and separate from bonding both components to each other.

It has also been known to combine the step of weaving tubular woven fabric and insertion of a thermoplastic or prevulcanized tubular liner at the loom. The bonding process has still to be done subsequently A disadvantage of tubular liners no matter how they are inserted in a woven tubular fabric is that the tubular liner will be impressed with the undulations of the outer woven tubular fabric because of the steam pressure imposed. The surface of a woven tubular fabric is uneven and if a relatively thin liner is inserted into a woven tubular fabric the surface of the thin liner will follow the contours of the interior of the woven tubular fabric and provide an uneven liner surface. The more uneven the surface of the liner the higher the friction loss when passing fluids through the lined tubular woven fabric. If a thicker tubular liner is used to reduce undulations on the interior of the liner the friction loss will be decreased. However a thicker liner will increase the cost and weight of the lined hose.

By continuously applying an elastomeric material on the interior of a continuous tubular woven fabric in the loom a lined tubular woven fabric can be fabricated. By co-ordinating the application of elastomeric material with the inevitable interruptions and restarts of the weaving process, a lined tubular woven fabric can be produced in any desired length. By applying an elastomeric flowing material, a smooth surface is created on the interior of the woven tubular fabric. The elastomeric material bonds directly to the interior of the tubular woven fabric avoiding the need of an intermediate bonding material between the elastomeric material and the tubular woven fabric which is necessary in prior art hoses to bond the pre-extruded tubular elastomeric material and the tubular woven fabric. The elastomeric material may be applied thinly or thickly, partially or fully as desired to produce finished hose having different qualities or characteristics.

U.S. Pat. No. 4,490,316 to Satzler discloses an apparatus and method for continuously extruding an elastomeric hose having a controlled internal size. The Satzler invention relates to extruded elastomeric hose employing two extruders, one for the inside and one for the outside. The invention herein relates to application of elastomer to the interior of a continuous woven tubular fabric. Further the Satzler invention does not disclose a die which is moveable in and out of the hose in response to a weaving process. Removal of the die forming the outer extrusion is a technical impossibility in the Satzler teaching. Similarly, U.S. Pat. No. 3,388,425 to Detter relates to an apparatus for coating the interior surfaces of a tubular article and teaches the use of a fixed mandrel within the tube for coating the interior of the tube while the instant invention relates to an insertable, retainable and removable extruder die used to form a continuous lined woven tubular article, which would not collapse upon removal of the die.

In the instant invention the elastomeric material is applied through an extruder which is suspended into the tubular fabric in the loom. The extruder and the loom are both electrically connected to a common control. If the loom stops for any reason the extruder will cease extruding and be withdrawn from the tubular fabric and loom. Similarly, if the loom is working and the extruder malfunctions the loom will be shut down and the extruder is withdrawn from the tubular fabric and loom. The control mechanism is connected to the normal loom controls which provide for shut down of the loom when fibers break during the weaving process.

The process of weaving a continuous woven tubular fabric results in the production of twelve to twenty inches per minute depending on the type of loom and type of tubular woven fabric. In a continuous process of extruding elastomer on the interior of the tubular woven fabric the speed at which the elastomer is applied is correlated to the speed at which the loom is producing tubular woven fabric. The extruder required is a low capacity extruder since the speed of production is dictated by the speed of the loom in producing continuous woven tubular fabric.

Figure 1:
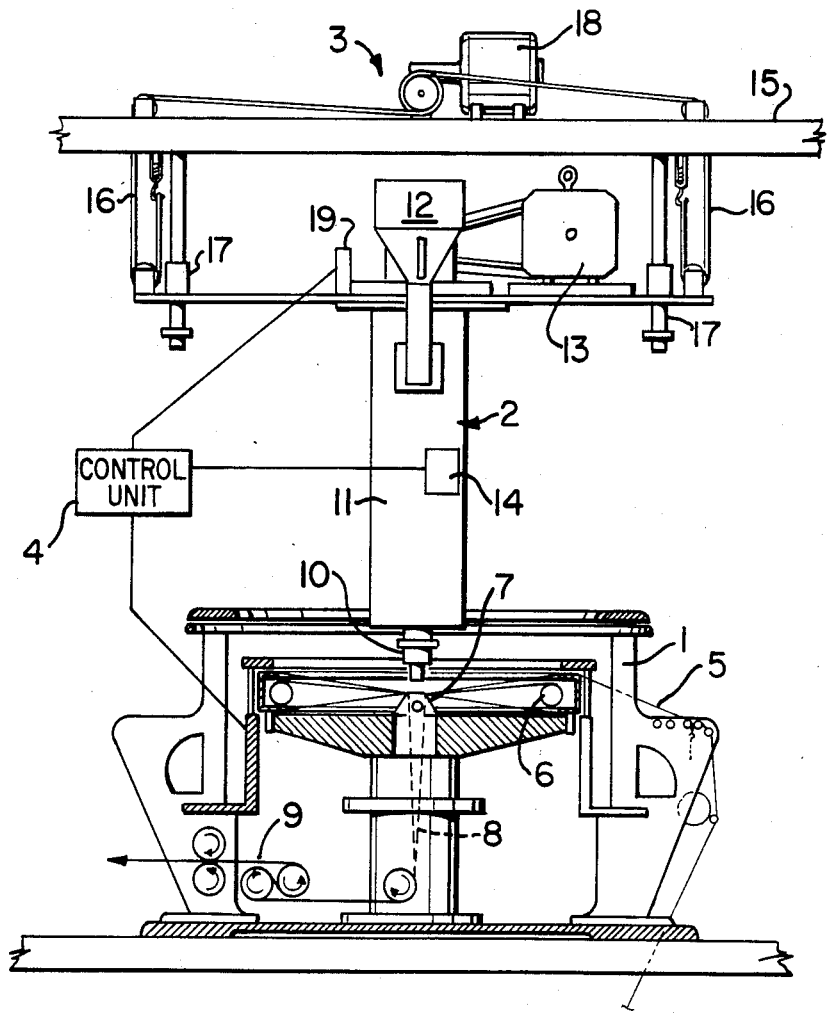
FIG. 1 is a front elevation view of a loom with extruder support and motive means suspending the extruder in the weaving ring.

Referring to FIG. 1, there is disclosed a circular loom 1, an extruder 2, an extruder elevating device 3, and a control unit 4.

The circular loom 1 is a conventional circular loom threaded with a multitude of warp ends 5 and a number of weft yarns 6 which are interwoven at the top of the weaving ring 7, the woven fabric 8 is removed from the circular loom 1 by a take off arrangement 9. The extruder 2 is comprised of a die 10, an extruder barrel 11, a feeder hopper 12 and drive means 13 and extruder control panel 14. The extruder barrel 11 and die 10 are suspended from extruder elevating device 3. Extruder elevating device 3 consists of a support frame 15, extruder suspending means 16, extruder guiding means 17, drive means 18 and extruder elevating device control panel 19. The control unit 4 receives information from the loom 1, the extruder control panel 14 and the elevating device control panel 19 analyses the information and controls the loom 1, extruder 2 and extruder elevating device 3.

Figure 2:
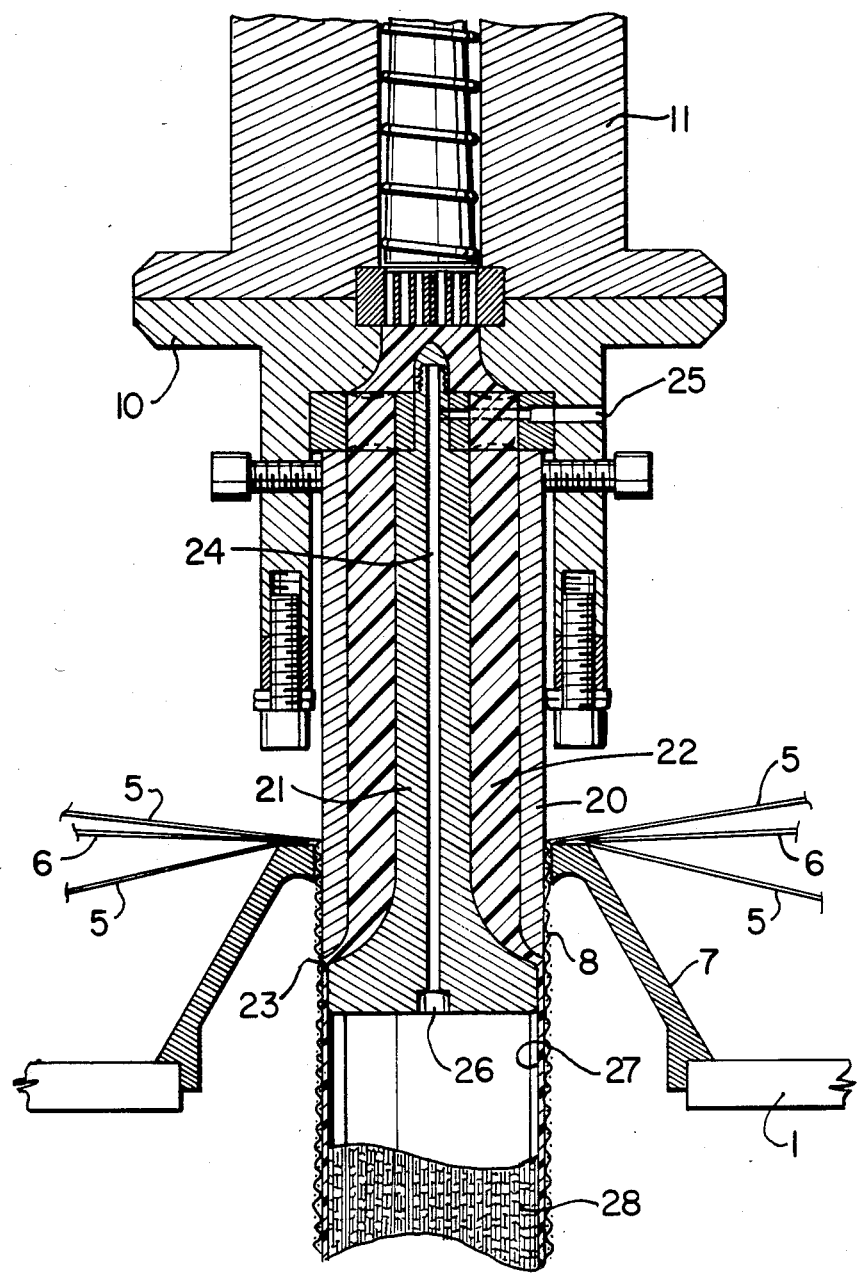
FIG. 2 is a cross sectional view of the weaving ring and extruder die.

Referring to FIG. 2 a more detailed representation of the extruder die 10 is shown. The extruder die 10 is attached to the barrel 11. The extruder die 10 includes outer walls 20 and mandrel 21 creating flow passage 22 therebetween exiting from the peripheral gap 23 at the bottom of flow passage 22. The extruder die 10 has incorporated therein a central channel 24 connected to inlet 25 on the exterior of the extruder die 10 and an outlet 26 at the bottom of mandrel 21.

Prior to commencement of weaving the extruder 2 is turned on to achieve the temperature necessary to extrude the coating material 27. Prior to commencement of the loom 1, the extruder 2 is lowered by extruder elevating device 3 into the woven fabric 8 within the weaving ring 7 and starts extruding. The loom 1 is started up and commences weaving and the extruder 2 continues to extrude coating material 27 through peripheral gap 23 on the interior of woven fabric 8. If loom 1, extruder 2 and extruder elevating device 3 operate satisfactorily the weaving and extrusion of the coating material 27 on woven fabric 8 produce coated woven tubular fabric 28. When the loom 1 or extruder 2 malfunction, or are stopped intentionally, control unit 4 will cause loom 1 to shut down and will cause extruder 2 to end extrusion and extruder elevating device 3 to remove the extruder barrel 11 and die 10 from the woven fabric 8 and the weaving ring 7.

The embodiments of the invention in which an exclusive property or privilege is claimed are defined as follows:

1. Apparatus for continuously extruding an elastomeric material on the interior of a continuous tubular woven fabric in a loom, comprising
   loom means to provide a continuous tubular woven fabric;
   extruder means capable of continuously extruding an elastomeric material, said extruder means including an extruder die means positioned adjacent said loom in a manner which enables said elastomeric material to be applied to the interior of said tubular woven fabric upon being formed in said loom;
   motive means for creating relative movement between the extruder and the woven fabric;
   sensing means for detecting stoppage of operation of said loom and of said extruder means;
   control means responsive to said sensing means directing said motive means to withdraw said extruder die means from a position adjacent said loom upon stoppage of operation of either said loom or said extruder means, said control means also directing said loom or extruder means to cease operation upon cessation of operation of the other.

2. A method for continuously extruding an elastomeric material on the interior of a continuous tubular woven fabric in a loom comprising the steps of:
   weaving a continuous tubular woven fabric in a loom;
   extruding an elastomeric material by means of extruder means positioned adjacent said loom in a manner which causes said elastomeric material to be applied to the interior of said tubular woven fabric upon being formed in said loom;
   sensing stoppage of operation of said loom or of said extruder means; and
   withdrawing said extruder die means from said position adjacent said loom upon stoppage of operation of either said loom or said extruder means, while also directing said loom or extruder means to cease operation upon cessation of operation of the other.

3. The method of claim 2 wherein the elastomeric material is extruded on the interior and through the tubular woven fabric to form a coating on the interior and exterior of the tubular woven fabric.

4. The method of claim 2 wherein the thickness of the elastomeric material is varied as said material is applied to the interior of said tubular woven fabric.

* * * * *